(12) United States Patent
Azagury et al.

(10) Patent No.: US 6,493,716 B1
(45) Date of Patent: Dec. 10, 2002

(54) GROUP COMMUNICATION SYSTEM WITH FLEXIBLE MEMBER MODEL

(75) Inventors: Alain Charles Azagury, Nesher (IL); Michael Factor, Haifa (IL); Gera Goft, Karkur (IL); Shlomit Pinter, Haifa (IL); Esther Yeger-Lotem, Mitzpe Aviv (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/487,474

(22) Filed: Jan. 19, 2000

(51) Int. Cl.$^7$ ................................................ G06F 17/30

(52) U.S. Cl. ...................................................... 707/10

(58) Field of Search .......................... 707/8, 10, 103 R, 707/104.1; 709/227, 466, 220, 204, 205; 370/352, 400, 401

(56) References Cited

U.S. PATENT DOCUMENTS

| | | | | |
|---|---|---|---|---|
| 5,341,372 A | * | 8/1994 | Kirkham | 370/400 |
| 6,335,927 B1 | * | 1/2002 | Elliott et al. | 370/352 |
| 6,339,784 B1 | * | 1/2002 | Morris et al. | 709/224 |

OTHER PUBLICATIONS

Jia, W. Zhou, W. Kaiser, Efficient algorithm for mobile multicast using anycast group—, J. Dept. of Comput. Sci., City Univ. of Hong Kong, China. This paper appears in: Communications, IEE Proceedings. On pp.: 14–18; Feb. 2001 vol.: 148 Issue.*

G. Goft and E. Lotem, "The AS/400 Cluster Engine: A Case Study"; presented at the International Group Communications Conference IGCC 99; Aizu, Japan, 1999.

Hayden, "Maestro Open Toolkit: Group Member", taken from the "Ensemble Reference Manual"; Cornell University, 1997.

* cited by examiner

*Primary Examiner*—Diane D. Mizrahi
(74) *Attorney, Agent, or Firm*—Darby & Darby

(57) ABSTRACT

A group communication system (GCS), for use within a group of clustered computing nodes, provides a flexible group membership model. Flexible group members are defined generally as physical computing entities (such as computing nodes or other devices) or logical computing entities that take part in a distributed application. Such logical entities may include substantially any combination of processes, threads and callback functions. Logical entities that are members in the group may also be objects, such as files, that at least at some times during their existence have no active processes or threads. A single member may include multiple simultaneous processes.

62 Claims, 6 Drawing Sheets

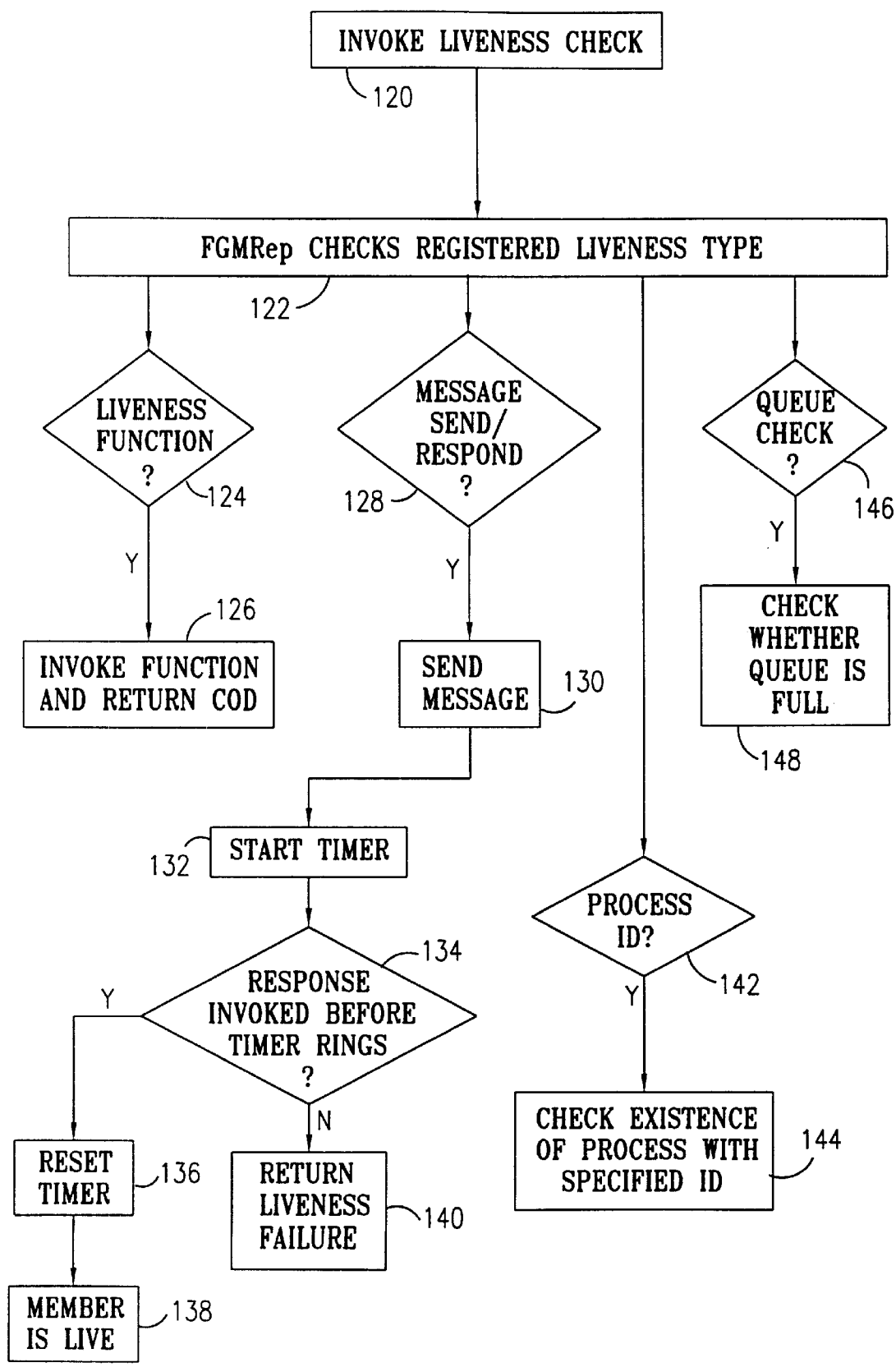

GROUP COMMUNICATION SYSTEM WITH FLEXIBLE MEMBER MODEL

FIELD OF THE INVENTION

The present invention relates generally to distributed computing systems, and specifically to distributed computing applications driven by group communication systems.

BACKGROUND OF THE INVENTION

Computer clusters are widely used to enable high availability of computing resources, coupled with the possibility of horizontal growth, at reduced cost by comparison with collections of independent systems. Clustering is also useful in disaster recovery. A wide range of clustering solutions are currently available, Distributed group communication systems (GCSs) enable applications to exchange messages within groups of clustered entities in a reliable, ordered manner. For including 390 Sysplex, RS/6000 SP, HACMP, PC Netfinity and AS/400 Cluster, all offered by IBM Corporation, as well as Tandem Himalaya, Hewlett-Packard Mission Critical Server, Compaq TruCluster, Microsoft MSCS, NCR LifeKeeper and Sun Microsystems Project Cascade. An AS/400 Cluster, for example, supports up to 128 computing nodes, connected via any Internet Protocol (IP) network. A developer of a software application can define and use groups of physical computing entities (such as computing nodes or other devices) or logical computing entities (such as files or processes) to run the application within the cluster environment. In the context of the present patent application and in the claims, such entities are also referred to as group members, and the term "entity" is used to refer interchangeably to physical and logical computing entities.

Distributed group communication systems (GCSs) enable applications to exchange messages within groups of clustered entities in a reliable, ordered manner. For example, the OS/400 operating system kernel for the above-mentioned AS/400 Cluster includes a GCS in the form of mlddleware for use by cluster applications. This GCS is described in an article by Goft et al., entitled "The AS/400 Cluster Engine: A Case Study," presented at the International Group Communications Conference IGCC 99 (Aizu, Japan, 1999), which is incorporated herein by reference. The GCS ensures that if a message addressed to the entire group is delivered to one of the group members, the message will also be delivered to all other live and connected members of the group. In this way, the group members can act upon received messages and remain consistent with one another. Another function performed by the GCS is to verify periodically that all of the members are "alive," i.e., functioning and able to perform their part in the distributed application. When one of the members fails a liveness check, or when members leave or join the group for some other reason, the GCS notifies the other members of the membership change.

Another well-known GCS is "Ensemble," which was developed at Cornell University, as were its predecessors, "ISIS" and "Horus." Ensemble is described in the "Ensemble Reference Manual," by Hayden (Cornell University, 1997), which is incorporated herein by reference.

GCSs known in the art require that a group member be a single software process, i.e., an instance of a program actively running on a computer, although some GCSs allow the process to have multiple threads. All of the messages that a member process receives are enqueued in a predefined queue, and are later dequeued by that process and handled by handlers that the process invokes. Limiting GCS membership to single processes makes the semantics of a group member relatively intuitive. For instance, one of the key functions of a GCS is discovering failures of group members. When a group member is a process, then a simple process existence check can be made. When a group member is not necessarily a single process, the task of checking group member liveness becomes complicated. Furthermore, when a group member process sends out a message, it is easy to relate the process to the particular member. The relation becomes less clear if there are multiple processes that can send a message on behalf of the group member, especially when several group members can reside on a common node. Likewise, it is simple for the GCS to deliver a message to a group member if there is only a single process or a single inbound queue to receive the message. When the member is not a single process (or not a process at all), however, it may not be clear to whom the message should be delivered.

Ordered handling of GCS messages by group members also becomes difficult if the members are not all single processes. Message delivery to a single process is serializable, since the process deals with one message at a time. Therefore, handing messages to a process in a certain order makes it easy to ensure that the messages will be handled by the process in the same order. On the other hand, if a group member includes multiple processes, this serializability is no longer guaranteed. Messages are still handed to the group member in a certain order, but handling of the messages, if carried out by several different processes, can terminate in a different relative order.

SUMMARY OF THE INVENTION

It is an object of some aspects of the present invention to provide a group communication system (GCS) in which membership is not restricted to single processes.

It is a further object of some aspects of the present invention to provide tools for use in distributed applications that afford the application designer greater flexibility in defining application structure and group membership.

It is yet a further object of some aspects of the present invention to provide a group structure and communication protocols that enhance the performance of distributed applications.

In preferred embodiments of the present invention, a group communication system (GCS), for use within a group of clustered computing entities, provides a flexible group membership model. Flexible group members (FGMs) are defined generally as computing entities that take part in a distributed application. Such entities may include substantially any combination of processes, threads and callback functions (referred to herein as callbacks). Members may also comprise objects, such as files, that at least at some times during their existence have no active processes or threads, or they may comprise multiple simultaneous processes.

When a member joins the group, a communication protocol is established between the member and the GCS, which is not necessarily dependent on any particular process being executed by the member. The protocol defines how the GCS is to check the liveness of the particular member and how messages are to be conveyed by the GCS to and from the member, in the appropriate, ordered manner. Thus, while the framework of the protocol is fixed, the details vary from member to member and are generally determined only at the time that the member joins the group. These details may also be changed during a life cycle of group membership.

In some preferred embodiments of the present invention, the communication protocol between the GCS and each of the FGMs is based on a unique token, which is created by the GCS when the member joins the group. This token is used by processes and other components of the FGM whenever they need to communicate with the GCS. It enables the GCS to identify unambiguously the member that is sending the message, even when multiple processes are running as a single member, or when multiple members are resident on a single node, or when a member can run in different processes at different instants in time.

In these and other preferred embodiments of the present invention, each FGM has a set of callbacks, i.e., functions that are defined and called when required for performing distinct services. Such callbacks are defined to handle particular, respective types of messages handed to the FGM by the GCS. Preferably, a different callback is defined for each type of GCS message. Alternatively, specific callbacks may be defined for only some of the GCS message types, while another general callback simply passes the messages through to a process that is being executed by the member or to a queue served by the process. Further alternatively, for a group member that comprises only a single process, the set of callbacks may consist only of such a general, "pass-through" callback, whereby the communication protocol between this member and the GCS emulates GCS protocols known in the art.

In preferred embodiments of the present invention, each FGM registers a liveness check with the GCS when it joins the group. The liveness check depends on the nature of the particular member. For example, if the member comprises a process, the liveness check preferably verifies process existence using the process identifier (as in GCSs known in the art) or otherwise verifies the responsiveness of the process to a given function invoked by the GCS. On the other hand, if the member comprises a data structure or a device, the liveness check verifies the responsiveness or functionality of the data structure or device. For example, a distributed application can use the GCS to implement a shared memory as a group member, which can be updated by several processes. The liveness of this group member, which includes no active processes, may be given by the availability of a file in the memory and/or internal consistency of the file, as determined by the application.

Most preferably, the GCS liveness check invokes one of the callbacks of the FGM, most preferably a callback that is defined specifically for this purpose. Alternatively, if a "pass-through" callback is used for a group member comprising a single process, as defined above, the liveness check is similarly carried out in a manner emulating GCS protocols known in the art.

The GCS of the present invention thus overcomes limitations of systems known in the art, allowing application developers substantially greater flexibility in building distributed applications based on the GCS by generalizing the definition of a group member. Furthermore, by using callbacks, rather than processes, the present GCS reduces its consumption of system resources and increases the efficiency of message handling, since fewer context switches and memory copies are required. This low-overhead mode of message handling also tends to increase the availability of group members for carrying out application tasks.

Although preferred embodiments described herein are based on a GCS, it will be appreciated that the principles of the present invention may similarly be implemented in substantially any distributed computing environment in which there are mechanisms for ordered message handling and keeping track of "liveness" of entities in a computing group or cluster. As noted above, such entities may comprise either physical or logical entities.

There is therefore provided, in accordance with a preferred embodiment of the present invention, a method for distributing messages among a group of member computing entities, which are mutually-linked in a distributed computing system, including conveying a sequence of messages to all of the member entities in the group in accordance with a communication protocol such that the messages are delivered in a uniform order to all of the member entities, at least one of which member entities does not include a process for at least some time during an existence of the group.

Preferably, the at least one of the member entities that does not include a process includes a data structure or, alternatively or additionally, a device.

Further preferably, conveying the sequence of messages in accordance with the communication protocol includes delivering the messages using a group communication system. Most preferably, the member entities take part in a distributed application running on the system.

There is additionally provided, in accordance with a preferred embodiment of the present invention, a method for distributing messages among a group of member computing entities, which are mutually-linked in a distributed computing system, including conveying a sequence of messages to all of the member entities in the group in accordance with a communication protocol such that the messages are delivered in a uniform order to all of the member entities, at least one of which member entities includes a plurality of processes.

There is also provided, in accordance with a preferred embodiment of the present invention, a method for transferring messages among a group of member computing entities, which are mutually-linked in a distributed computing system and which communicate in accordance with a communication protocol such that a sequence of messages is delivered to all of the member entities in the group in an order that is uniform among all of the member entities, the method including:

assigning a unique token to each of the member entities;

receiving a message, in accordance with the protocol, sent by one of the member entities, the message including the respective token; and processing the message responsive to the token.

Preferably, processing the message includes identifying the member entity sending the message based on the token.

In a preferred embodiment, the member entity sending the message includes a plurality of objects, and wherein receiving the message sent by the member entity includes receiving respective messages from two or more of the plurality of objects, wherein the respective messages include the same token.

There is further provided, in accordance with a preferred embodiment of the present invention, in a distributed computing system, in which a group of mutually-linked member computing entities communicate in accordance with a communication protocol such that a sequence of messages is delivered to all of the member entities in the group in an order that is uniform among all of the member entities, a method for processing the messages received by the member computing entities, including:

defining for each of the member entities at least one callback function to be invoked when messages of a predetermined type are handed to the entity;

receiving a message of the predetermined type; and invoking the callback function to handle the message.

Preferably, defining the at least one callback function includes defining a plurality of different callback functions for a corresponding plurality of different message types.

In a preferred embodiment, defining the at least one callback function includes defining a liveness check function, and receiving the message of the predetermined type includes receiving a periodic liveness check message, and invoking the callback function includes invoking the liveness check function responsive to the liveness check message so as to determine whether any of the member entities is unable to carry out its part in the application.

In another preferred embodiment, defining the at least one callback function includes defining different callback functions for different ones of the member entities. Alternatively, multiple member entities may share the same callback function or functions.

Preferably, invoking the callback function includes aborting delivery of the message if the callback function does not return within a specified time. Further preferably, invoking the callback function includes waiting for the callback function invoked by a first message in the sequence to return before invoking a callback function to handle a second, subsequent message, whereby the uniform order is maintained. Alternatively or additionally, invoking the callback function includes acquiring a permission required for the callback.

In yet another preferred embodiment, defining the at least one callback function includes defining a callback such that when messages of the predetermined type are received, they are passed to a designated process run by the member entity.

There is moreover provided, in accordance with a preferred embodiment of the present invention, in a distributed computing system, in which a group of mutually-linked member computing entities take part in a distributed computing application, a method for checking liveness of the member computing entities, including:

defining a respective liveness function for each member entity that joins the group, at least two of the member entities having different liveness functions; and periodically invoking the liveness functions of the member entities so as to determine whether any of the entities is unable to carry out its part in the application.

Optionally, some of the member entities may share the same liveness function.

Preferably, invoking the liveness function includes conveying a liveness check request from a group communication system.

In a preferred embodiment, defining the liveness function includes defining a liveness function for at least one of the member entities substantially without reference to execution of any process by the at least one of the member entities.

In another preferred embodiment, defining the liveness function includes, for at least one of the member entities, defining a message that is sent to the member entity when the function is invoked. Preferably, periodically invoking the liveness functions includes sending the message and determining whether the object responds within a predetermined period of time.

In still another preferred embodiment, defining the liveness function includes, for at least one of the member entities, defining a function that checks the existence of a process with a specified identification.

In yet another preferred embodiment, defining the liveness function includes, for at least one of the member entities, defining a function that checks whether a queue held by the member entity is full.

There is still further provided, in accordance with a preferred embodiment of the present invention, in a distributed computing system, in which a group of nmutually-linked member computing entities take part in a distributed computing application, a method for checking liveness of one of the member computing entities, including periodically invoking a liveness function so as to determine whether the entity is unable to carry out its part in the application, substantially without reference to execution of any process by the member entity.

In a preferred embodiment, invoking the liveness function includes, for at least one of the member entities, checking whether a queue held by the member entity is full.

There is furthermore provided, in accordance with a preferred embodiment of the present invention, distributed computing apparatus, including:

a computer network; and a group of computer nodes, mutually-linked by the network in accordance with a communication protocol such that when a sequence of messages is transmitted in the group, it is delivered to member computing entities on all of the nodes in a uniform order, at least one of which member entities does not include a process for at least some time during an existence of the group.

There is additionally provided, in accordance with a preferred embodiment of the present invention, distributed computing apparatus, including:

a computer network; and a group of computer nodes, mutually-linked by the network in accordance with a communication protocol such that when a sequence of messages is transmitted in the group, it is delivered to member computing entities on all of the nodes in a uniform order, at least one of which member entities includes a plurality of processes.

There is also provided, in accordance with a preferred embodiment of the present invention, distributed computing apparatus, including:

a computer network; and a group of computer nodes, mutually-linked by the network using a group communication system such that when a sequence of messages is transmitted in the group, it is delivered to member computing entities on all of the nodes in a uniform order to all of the member entities, wherein a unique token is respectively assigned to each of the member entities, such that whenever a message is passed from any one of the member entities to the group communication system, it includes the respective unique token.

There is further provided, in accordance with a preferred embodiment of the present invention, distributed computing apparatus, including:

a computer network; and a group of computer nodes, mutually-linked by the network in accordance with a communication protocol such that when a sequence of messages is transmitted in the group, it is delivered to member computing entities on all of the nodes in a uniform order, and such that for each of the member entities, at least one callback function is defined, to be invoked when messages of a predetermined type are handed to the entity.

There is moreover provided, in accordance with a preferred embodiment of the present invention, distributed computing apparatus, including:

a computer network; and a group of computer nodes, mutually-linked by the network and configured to support member computing entities that take part in a distributed computing application running on the apparatus, wherein a respective liveness function is defined or each member entity that joins the group, at least two of the member entities having different liveness functions, which liveness functions are invocable so as to determine whether any of the entities is unable to carry out its part in the application.

There is yet further provided, in accordance with a preferred embodiment of the present invention, distributed computing apparatus, including:

a computer network; and a group of computer nodes, mutually-linked by the network and configured to support member computing entities that take part in a distributed computing application running on the apparatus, wherein a respective liveness function is defined for at least one of the member entities so as to determine whether the entity is unable to carry out its part in the application, substantially without reference to execution of any process by the member entity.

There is still further provided, in accordance with a preferred embodiment of the present invention, a computer software product for distributing messages among a group of member computing entities, which are mutually-linked in a distributed computing system, the product including a computer-readable medium having program instructions stored therein, which instructions, when read by a computer, cause the computer to convey a sequence of messages to all of the member entities in the group in accordance with a communication protocol such that the messages are delivered in a uniform order to all of the member entities, at least one of which member entities does not include a process for at least some time during an existence of the group.

Preferably, the product includes group communication system middleware.

There is also provided, in accordance with a preferred embodiment of the present invention, a computer software product for distributing messages among a group of member computing entities, which are mutually-linked in a distributed computing system, the product including a computer-readable medium having program instructions stored therein, which instructions, when read by a computer, cause the computer to convey a sequence of messages to all of the member entities in the group in accordance with a communication protocol such that the messages are delivered in a uniform order to all of the member entities, at least one of which member entities includes a plurality of processes.

There is additionally provided, in accordance with a preferred embodiment of the present invention, a computer software product for transferring messages among a group of member computing entities, which are mutually-linked in a distributed computing system and which communicate in accordance with a communication protocol such that a sequence of messages is delivered to all of the member entities in the group in an order that is uniform among all of the member entities, the product including a computer-readable medium having program instructions stored therein, which instructions, when read by a computer, cause the computer to assign respective unique tokens to the member entities, such that messages including the respective tokens are sent by the member entities in accordance with the protocol and are processed responsive to the tokens.

There is further provided, in accordance with a preferred embodiment of the present invention, a computer software product for use in a distributed computing system in which a group of mutually-linked member computing entities communicate in accordance with a communication protocol such that a sequence of messages is delivered to all of the member entities in the group in an order that is uniform among all of the member entities, the product including a computer-readable medium having program instructions stored therein, which instructions, when read by a computer, cause the computer to define for each of the member entities at least one callback function, to be invoked when messages of a predetermined type are handed to the entity, such that when a message of the predetermined type is received by the member entity, the callback function is invoked to handle the message.

There is moreover provided, in accordance with a preferred embodiment of the present invention, a computer software product for use in a distributed computing system in which a group of mutually-linked member computing entities take part in a distributed computing application, the product including a computer-readable medium having program instructions stored therein, which instructions, when read by a computer, cause the computer to define a respective liveness function for each member entity that joins the group, such that at least two of the member entities have different liveness functions, and to periodically invoke the liveness functions of the member entities so as to determine whether any of the entities is unable to carry out its part in the application.

There is furthermore provided, in accordance with a preferred embodiment of the present invention, a computer software product for use in a distributed computing system in which a group of mutually-linked member computing entities take part in a distributed computing application, the product including a computer-readable medium having program Instructions stored therein, which instructions, when read by a computer, cause the computer to periodically invoke a liveness function so as to determine whether a given one of the member computing entities is unable to carry out its part in the application, substantially without reference to execution of any process by the given member entity.

The present invention will be more fully understood from the following detailed description of the preferred embodiments thereof, taken together with the drawings in which:

BRIEF DESCRIPTION OF THE DRAWINGS

FIG. 7 is a flow chart that schematically illustrates a method for checking the liveness of members in a distributed computing group, in accordance with a preferred embodiment of the present invention.

DETAILED DESCRIPTION OF PREFERRED EMBODIMENTS

Figure 1:
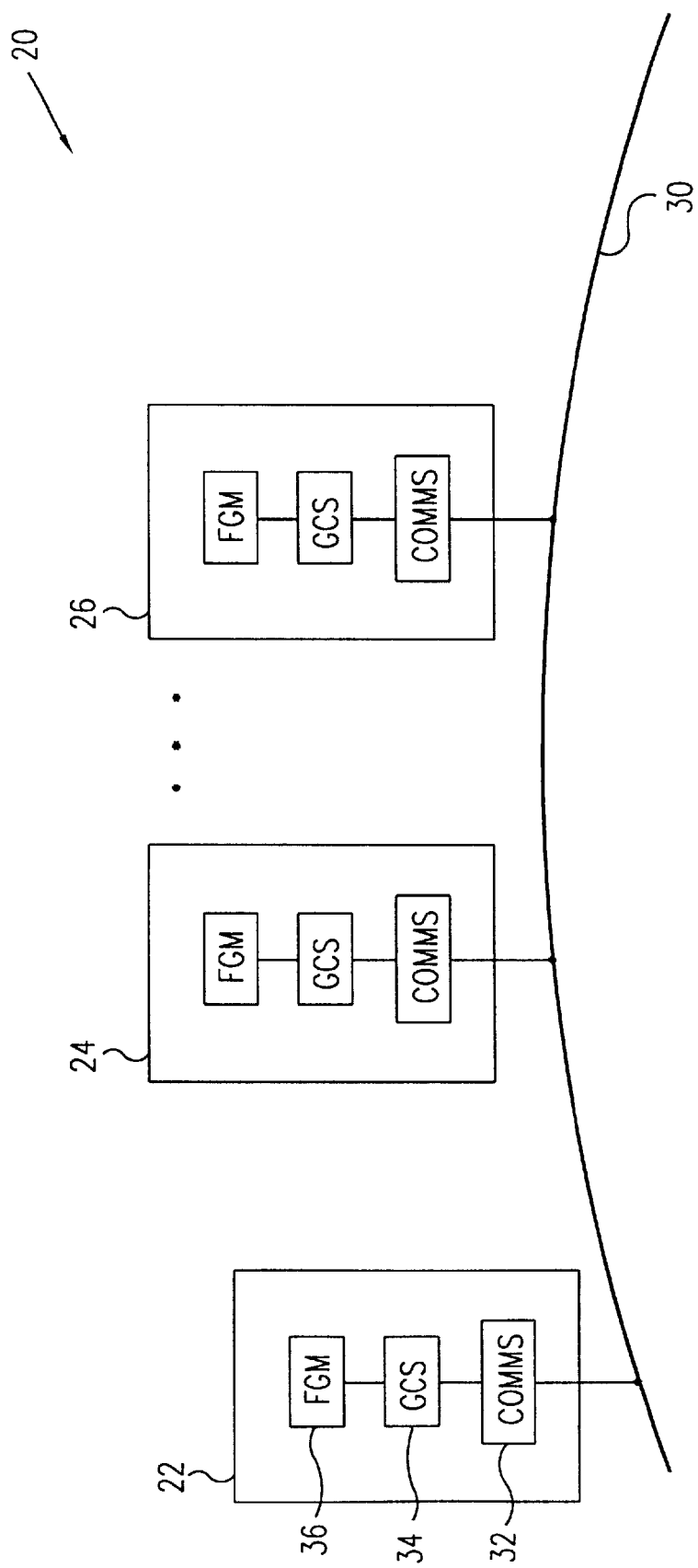
FIG. 1 is a block diagram that schematically illustrates a distributed computing group, in accordance with a preferred embodiment of the present invention.

FIG. 1 is a block diagram that schematically illustrates a distributed computing group 20, comprising a plurality of computing entities, or members 22, 24, 26, . . . , n accordance with a preferred embodiment of the present invention. Typically, as shown in the figure, each member is identified with a respective computing node in a cluster of nodes linked by a network 30. Alternatively, multiple members may reside on a single node. The nodes preferably comprise IBM AS/400 computers, running the OS/400 operating system, which includes a GCS middleware layer 34. Network 30 preferably comprises a local area network (LAN) or switch fabric, which most preferably operates in accordance with the Internet Protocol (IP). Alternatively, any other suitable types of nodes, network, operating system and GCS that are known in the art of distributed computing may be used.

Each of members 22, 24, 26, . . . , runs a component of a software application, such that operations of the application are distributed among the members. The application component of each member is referred to as a flexible group member (FGM) 36, whose properties are defined hereinbelow. GCS 34 provides facilities that support such distributed operation, including guaranteed distribution of messages among the members, as is known in the art, and reporting on membership changes in the group of members running the application, as described hereinbelow. The GCS ensures that all of the group members receive consistent membership change messages (as well as other multicast messages) in the same order. A communication layer 32, as is known in the art, is responsible for reliable messaging among the nodes.

Software for FGM 36, GCS 34 and other components of group 20 is typically distributed to the nodes over network 30. Alternatively, the software may be supplied on tangible media, such as CD-ROM, for installation on the nodes. Further aspects of GCS 34 are described in a U.S. patent application entitled "Middleware Support for Primary Component in a Partitionable Cluster Environment," filed Dec. 9, 1999; in another U.S. patent application entitled, "Ordered Sub-Group Messaging in a Group Communication System," filed Dec. 27, 1999; and in still another U.S. patent application entitled "Delivery of Configuration Changes in a Group Communication System," filed Jan. 12, 2000. All of these applications are assigned to the assignee of the present patent application, and their disclosures are incorporated herein by reference.

Figure 2:
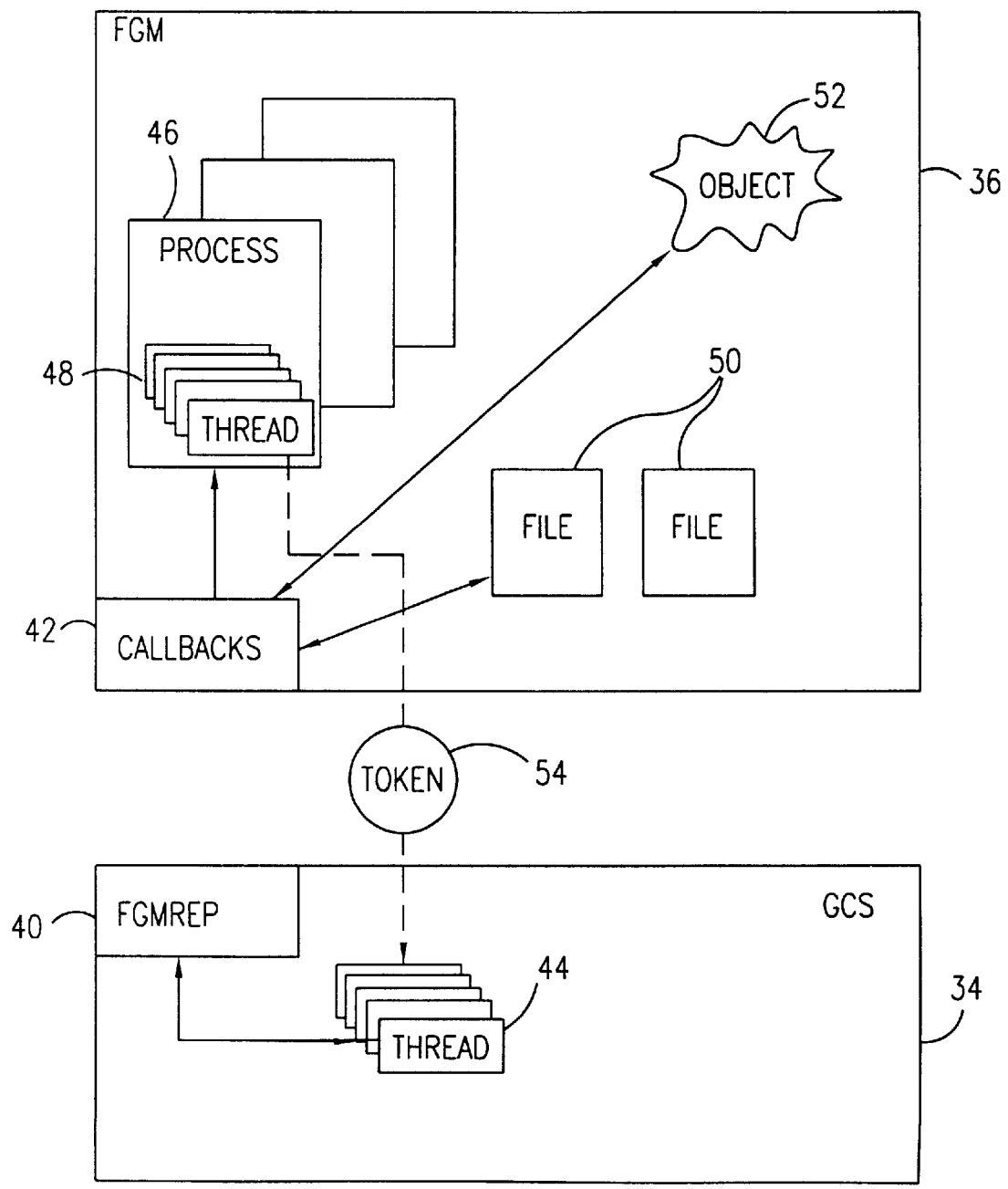
FIG. 2 is a block diagram that schematically illustrates the structure and interactions of a flexible group member and a group communication system used in the system of FIG. 1, in accordance with a preferred embodiment of the present invention.

FIG. 2 is a block diagram showing details of the implementation of FGM 36 and GCS 34, in accordance with a preferred embodiment of the present invention. This implementation uses an object-oriented approach, preferably in the C++ language, although any other suitable programming approach and language may likewise be used. FGM 36 may comprise substantially any type or combination of processes 46, data structures 50 or other objects 52 that serve as components of a distributed application running on system 20. As illustrated in FIG. 2, the FGM may comprise multiple processes 46, and each of the processes may run multiple threads 48.

A class FGMRep is defined by GCS 34, which preferably provides a statically- or dynamically-linkable library for this class and other associated classes. An abstract definition of the FGMRep class is presented in an Appendix to this specification. Upon registering with the GCS, FGM 36 creates an object 40 of the FGMRep class. Object 40 specifies functions of the FGM that can be called by the GCS, such as liveness and callback functions. Preferably, object 40 also contains permissions, such as a user ID, that the GCS may need to use in serving the FGM, as described further hereinbelow.

Upon registration of the FGM, GCS 34 generates a token 54, which is unique to the particular FGM 36. The token is an identifier that is included in messages sent by the FGM, typically in the message header, to both the GCS and to other members of the group. The token is stored in FGMRep object 40 and is used by the components of the FGM (such as processes 46 and objects 52) whenever they need to communicate with the GCS. The token is shared among the different components and thus enables the GCS to identify uniquely which FGM has sent it a particular communication, even when the messages are sent by multiple, different processes in the FGM.

Thus, FGMRep object 40 is preferably referenced by both GCS 34 and FGM 36 in their mutual communications. Alternatively, the GCS may copy object 40 into its own address space. The processes of registering the FGM with the GCS and of subsequent communications between the GCS and the FGM are described further hereinbelow. Optionally, aspects of the registration of the FGM may be modified during a life cycle of the FGM.

An application developer making use of the flexible group member model must define, for each FGM 36, certain objects that are accessed by threads 44 of GCS 34 when the GCS needs to communicate with the FGM. These components, represented symbolically by a callback block 42 in FIG. 2, are defined in the construction of FGMRep object 40, upon registration of the FGM with the GCS. There are three essential parts to this block:

1. The name of the group of which the FGM is a member, and the member ID of the FGM in the group.
2. Liveness check handle—This is a handle to an object, preferably in the form of a callback, containing a liveness check specification. It could be a liveness function and its parameters, registered by FGM 36 for the use of GCS 34. It could also be a specification of one choice from a set of standard checks, such as checking if a receive queue gets emptied or if a specified process exists, or sending a liveness check message to a queue and waiting for a response within a certain period of time.
3. Callback functions—This is a handle to an object containing a specification of how to handle incoming messages. The object contains a set of one or more callback functions to be called when various types of messages are to be delivered. For example, one such callback function could be writing the message to a certain queue. Each callback function is associated with the type or types of messages that invoke it, as defined by the FGM.

Thus, to deliver a message from GCS 34 to FGM 36, the thread 44 of the GCS that is responsible for the communication invokes the specified callback function. The thread waits for the return of the callback before delivering the next message, rather than simply enqueueing the message on a predefined queue as in GCSs known in the art. This system of callbacks thus supports the ordered delivery property of GCS. For practical reasons, it is typically necessary that each callback function be bounded in execution time. If a callback execution exceeds the time limit, the GCS will consider the FGM to have failed, and will take action accordingly. The FGM callbacks themselves can invoke methods of FGMRep object 40, such as when a callback includes a message send.

Optionally, a callback may specify permissions or authorizations to be acquired by the GCS task upon entry to the execution of the callback. These permissions, which are needed, for example, to access operating system resources, are generally dependent on the platform on which the GCS runs. When invoking the callback function, GCS thread 44 acquires and uses the permissions that were pre-registered by the FGM and thus were stored in object 40, in place of its own global permissions. This method of acquiring permissions provides a useful isolation between the permissions of the distributed application and the usually wider permissions used by GCS 34 for its own functions. Upon completion of the callback function, the GCS thread resumes its previous GCS permissions. In order to defend the GCS itself from malicious callback implementation, each callback preferably comprises a trusted code.

Preferably, the FGM puts the callbacks in a dynamically-linkable location (DLL on some platforms), to allow creation and deletion of FGMs while the application is running.

Figure 3:
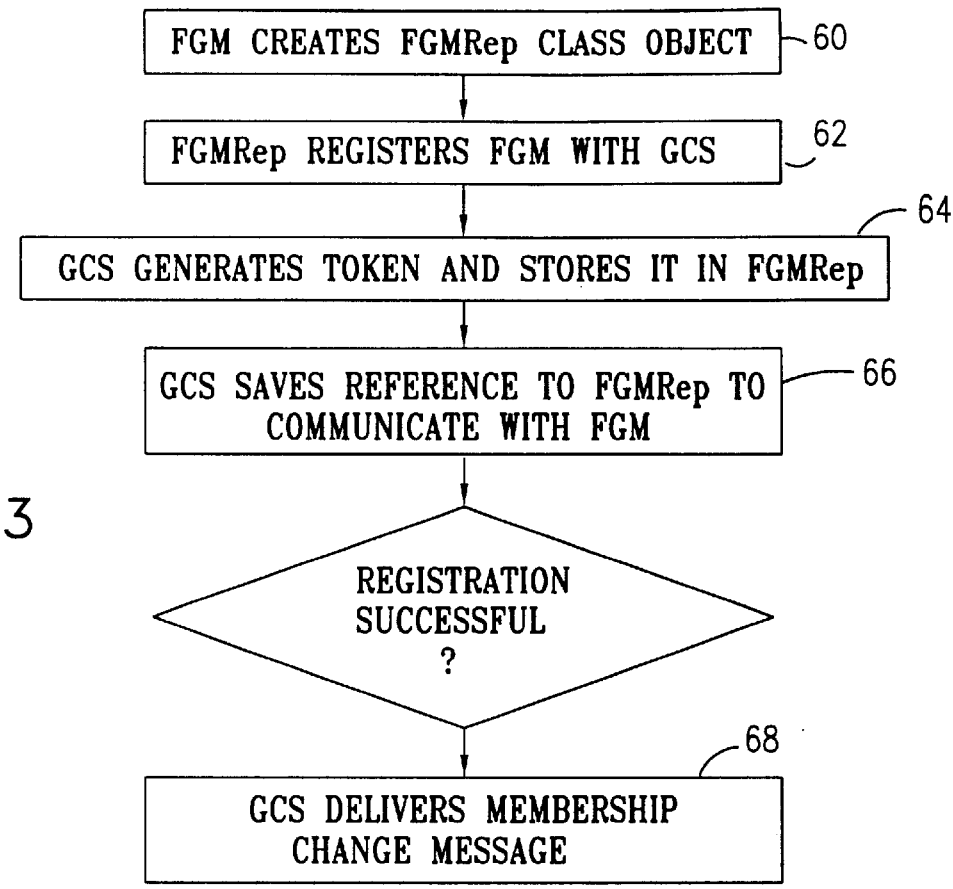
FIG. 3 is a flow chart that schematically illustrates a method by which a group member joins a distributed computing group, in accordance with a preferred embodiment of the present invention.

FIG. 3 is a flow chart that schematically illustrates a method for registration of FGM 36 with GCS 34, in accordance with a preferred embodiment of the present invention. At an object creation step 60, FGMRep object 40 is created, using one of threads 48, for example, and specifying the liveness function, callbacks and group name for this FGM, as described above. At a registration step 62, object 40 invokes an application program interface (API) of the GCS to register the FGM, wherein object 40 itself is passed to the API as a parameter. At a token generation step 64, the GCS acquires the registration information from the API and generates unique token 54 for this member. The token is Joined to the specified group name and is stored in the FGMRep object. It is subsequently treated by the GCS as representing this particular member in communications both with the GCS itself and with other members of the group.

In an alternative embodiment, when FGM 36 connects to the GCS at step 60, the FGM is configured to specify only its liveness function, and receives unique token 54 in return. In order to become a group member, the FGM then invokes a second interface of the GCS, to which it specifies the group name and callbacks. This alternative allows the same FGM to become a member of two or more groups concurrently. The FGM has appropriate callbacks for each group, but has only a single liveness function that is common to all of them and therefore must be checked by the GCS only once for all of the groups.

At a reference step 66, GCS 34 saves a reference to FGMRep object 40 for use in further communications with this FGM 36. Alternatively, as mentioned above, the GCS copies the object into its own address space, for the sake of improved security and robustness. At this point, if the registration process has been completed successfully, the GCS delivers a membership change message to all of the members in the group, at a message delivery step 68, in order to inform them that a new member has coined. Methods of message delivery in system 20 are described hereinbelow with reference to FIG. 6.

Figure 4:
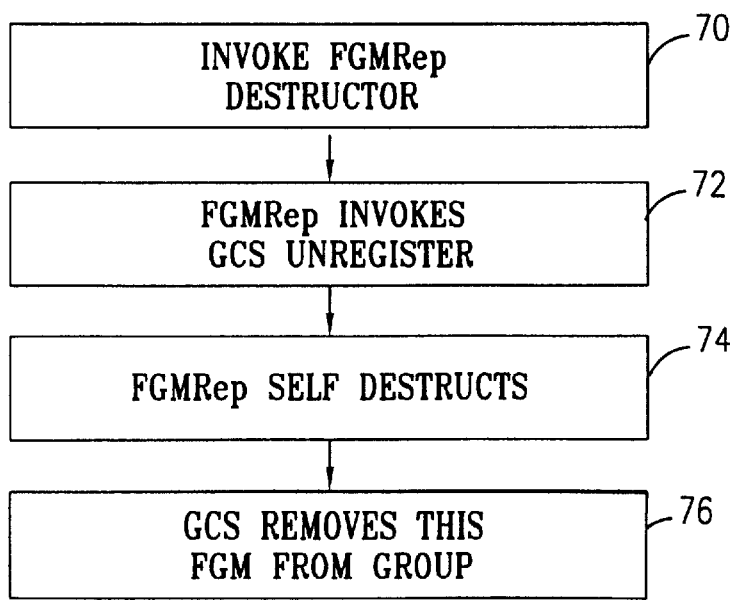
FIG. 4 is a flow chart that schematically illustrates a method by which a group member leaves a distributed computing group, in accordance with a preferred embodiment of the present invention.

FIG. 4 is a flow chart that schematically illustrates a method by which FGM 36 unregisters as the member of a group, in accordance with a preferred embodiment of the present invention. At an invocation step 70, a destructor is invoked in order to remove FGMRep object 40. The destructor may be invoked either by one of FGM threads 48 or by one of GCS threads 44 in the course of executing a callback from the FGM. At an unregistration step 72, object 40 invokes an "unregister member" routine in the GCS API. Object 40 then destroys itself, at a self-destruction step 74. GCS 34 removes this FGM from the group in question, at a removal step 76. Token 54 is preferably not reused.

Figure 5:
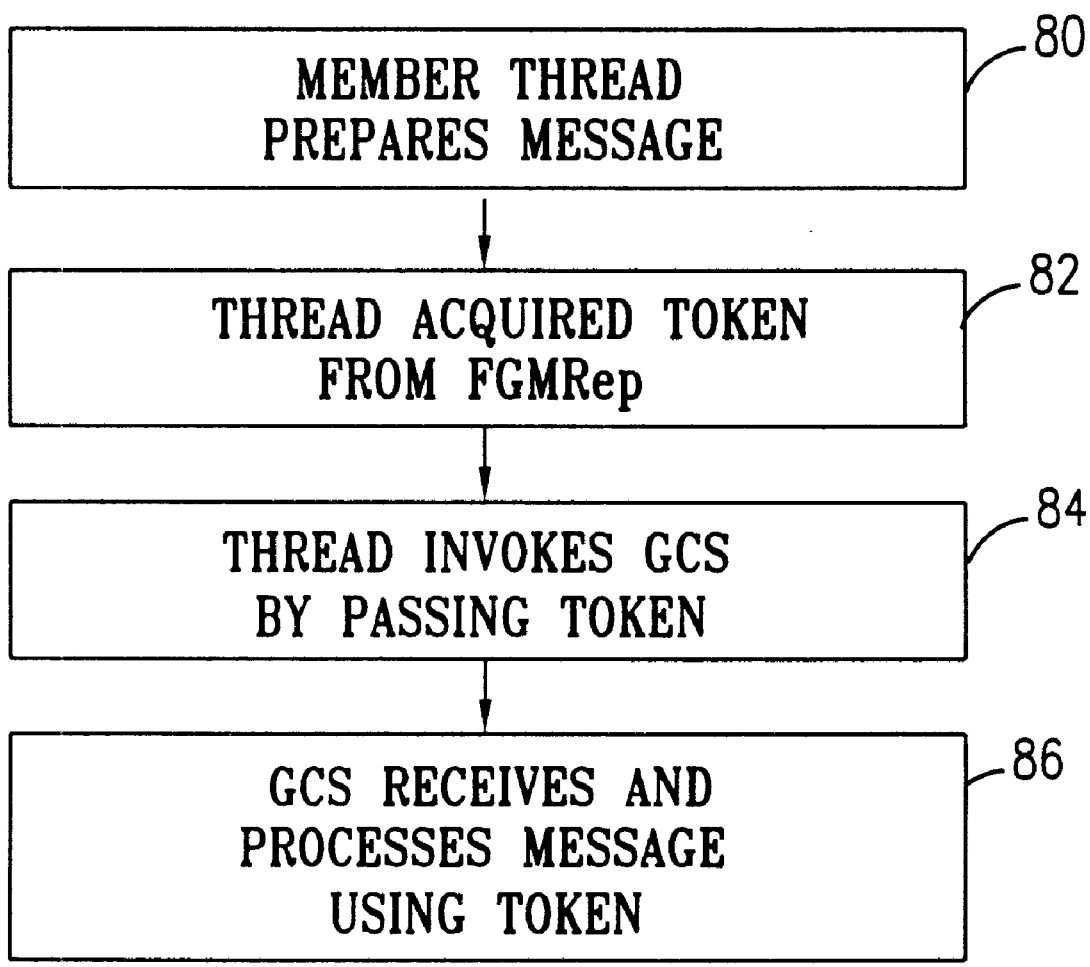
FIG. 5 is a flow chart that schematically illustrates a method by which a group member sends a message within a distributed computing group, in accordance with a preferred embodiment of the present invention.

FIG. 5 is a flow chart that schematically illustrates a method by means of which one of FGM threads 48 sends a message to GCS 34, in accordance with a preferred embodiment of the present invention. At a message preparation step 80, the thread prepares the message for sending. The thread acquires token 54 from object 40 at a token acquisition step 82, using the FGMRep method getToken( ) (as listed in the Appendix) Thread 48 conveys the message directly to the GCS messaging interface, by passing the token to the GCS, at a token passing step 84. Based on the token, the GCS processes the message using an appropriate one of its threads 44, at a message processing step 86. Regardless of which thread, process or other object in FGM 36 sent the message, the GCS recognizes it as having originated from this member on the basis of the token.

A number of advantages in the performance of system 20 ensue from the use of token 54 and the consequent possibility for a member to have multiple threads 48 and multiple processes 46 communicating with GCS 34. Multi-threaded FGMs allow master-slave or peer-peer structuring, in which each thread can send messages (and possibly receive messages) in the group. This feature saves context switches, thus improving system performance. It also reduces the amount of coding required for the distributed application, since there is no need for additional inter-thread messaging, as is the case when some central thread must be used to send all group messages. Both multi-threaded and multi-process FGMs provide enhanced flexibility in structuring and refinement of a distributed application. It is particularly convenient to have separate processes running on one group member in order to meet programming needs such as memory isolation. Multi-process group members also afford advantages similar to multi-threading in environments that do not efficiently support multi-threading, or do not support multi-threading at all.

Figure 6:
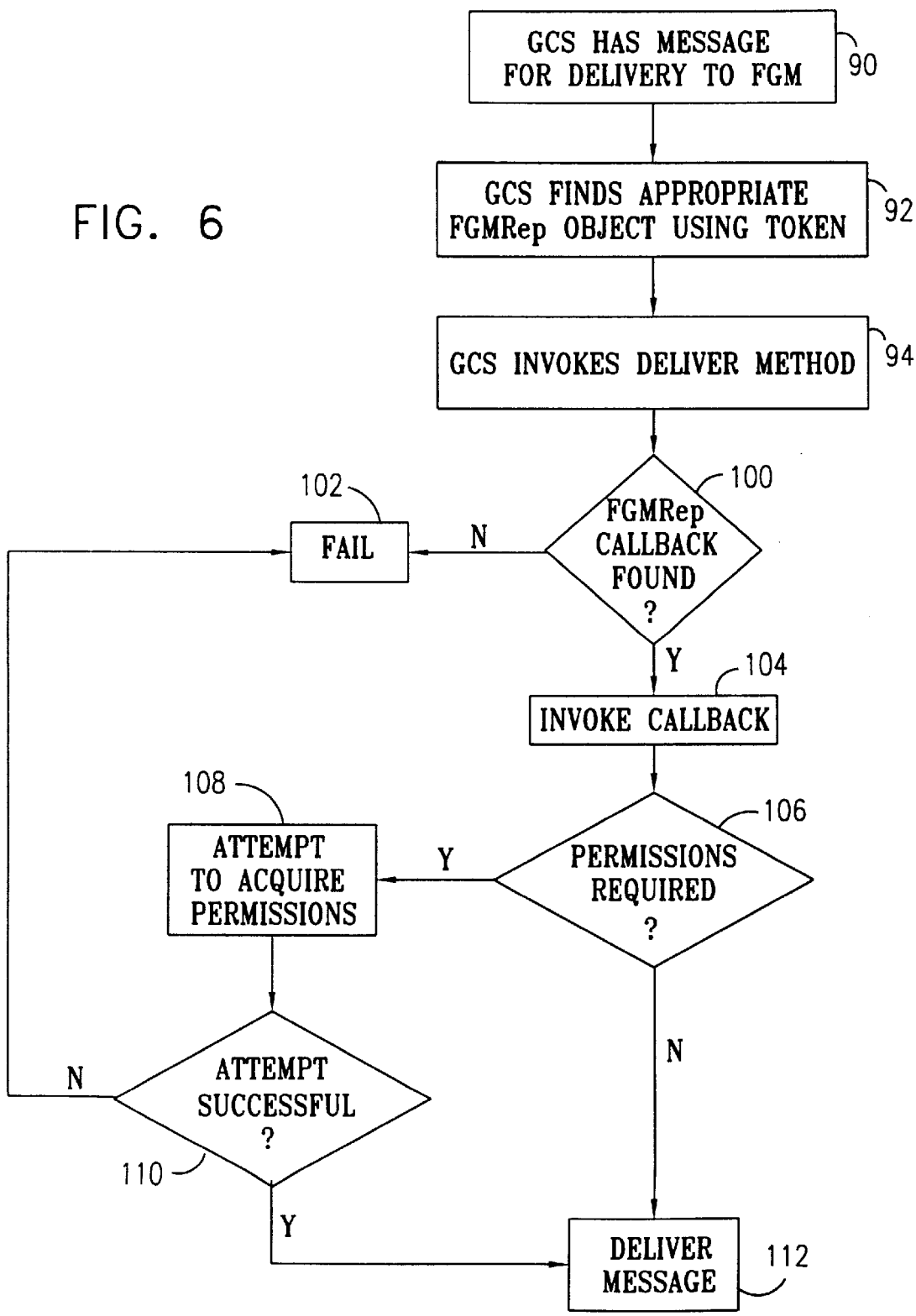
FIG. 6 is a flow chart that schematically illustrates a method by which a message is delivered to a group member in a distributed computing group, in accordance with a preferred embodiment of the present invention.

FIG. 6 is a flow chart that schematically illustrates a method for delivery of a message from GCS 34 to FGM 36, in accordance with a preferred embodiment of the present invention. This method is invoked, at a step 90, whenever the GCS has a message to deliver to the FGM. GCS 34 finds the appropriate FGMRep object 40, using the corresponding token, at an object finding step 92. At a delivery invocation step 94, the GCS then invokes the appropriate method held by object 40 to deliver the message.

Preferably, as noted above, at the time of registration, FGM 36 defines a vector of callbacks, which are held in object 40 and are activated in response to method invocation by the GCS at step 94. Most preferably, a different callback is defined for each type of GCS message, such as membership messages from the GCS, peer messages from other members, error messages, etc. Alternatively, the vector may comprise specific callbacks for only some of the GCS message types. In this case, there is preferably another, general callback that simply passes other message types through to a designated one of processes 46 of the member or to a queue served by the process. Further alternatively, if FGM 36 comprises only a single process, the callback vector may consist only of one such general, "pass-through" callback. In this case, the communication protocol between this member and the GCS emulates GCS protocols known in the art. The flexible member model defined herein can thus be used to run distributed applications written for conventional GCSs with only minor modifications to the applications.

Upon invoking the message delivery method at step 94, GCS 34 starts a timer to time the execution of the callback. If the timer expires before the callback has returned, the GCS aborts the method and notes a failure of FGM 36. It may also occur that the callback vector in FGMRep object 40 includes no callback for the particular message type that the GCS is trying to deliver. In this case, if no appropriate callback is found at a find callback step 100, then the FGMRep object notes a failure of the FGM, at a failure step 102. In the case of such failures, the GCS is programmed to remove the offending member from the group or to take corrective action, as appropriate.

Assuming that the appropriate callback is found, this callback is invoked at a callback invocation step 104. Preferably, subsequent GCS messages are blocked until the callback returns. These messages may be ordered using substantially any ordering mechanism known in the GCS art, including first-in-first-out (FIFO) ordering, causal ordering and total message ordering. The ordering will be strictly maintained by blocking the subsequent messages. Alternatively, not all messages are blocked in this manner, but only certain subsets of the messages, such as membership change messages and those types of application messages for which ordering was requested.

At a permission check step 106, object 40 determines whether any particular permissions are required in order to deliver the message in question. If not, the message is simply delivered by the appropriate callback, at a delivery step 112. If permissions are required, object 40 attempts to acquire the necessary permissions, at a permission acquisition step 108. If the attempt is found to have been unsuccessful, at an attempt evaluation step 110, the delivery is aborted, and the method ends at failure step 102. If the permissions are acquired, then the message is delivered at step 112. Subsequently, the previous permissions are resumed.

The use of callbacks, as described hereinabove, is particularly advantageous in terms of efficient handling of messages. When callbacks are used in this manner, there are no context switches in the upcall stream, and there is no need for a copy to memory when a message is delivered to the FGM. Furthermore, in some cases it is preferable not to have separate processes for different members, in order to save code writing and reduce consumption of system resources. In a cluster environment in which there are many groups that are idle most of the time, the use of callbacks enables a small number of GCS threads to handle all incoming messages for all of the groups. Because the callback approach makes it possible to know when a FGM finishes handling a given message, dependencies between groups can be easily supported by simply waiting for the completion of the callback function, rather than having to wait for an additional message from a FGM to the GCS notifying it of handler completion. Further aspects of implementing inter-group and sub-group dependencies are described in the above-mentioned patent application entitled "Ordered Sub-Group Messaging in a Group Communication System."

FIG. 7 is a flow chart that schematically illustrates a method for liveness checking of FGM 36, in accordance with a preferred embodiment of the present invention. The figure illustrates a number of different types of liveness checks that can be used, depending on the nature of the FGM (process, device, data structure or other object) and the particular needs of the application. Other types of liveness checks will be apparent to those skilled in the art and can be integrated into the method of FIG. 7 in a straightforward manner.

At a liveness invocation step 120, GCS 34 (or any other component in the group) periodically invokes the liveness-Check method in the FGMRep class (see Appendix) At a type checking step 122, FGMRep object 40 determines what type of liveness check has been registered for this FGM 36. A number of different, exemplary types are respectively invoked at steps 124, 128, 142 and 146. As shown at step 124, the liveness check may simply be a function, preferably a callback, which performs some predetermined check on the liveness of one or more of the objects in FGM 36 and returns a code as the result. For example, if FGM 36 comprises a shared memory, which includes no active processes, the liveness function may check the availability of a file in the memory. On the other hand, if FGM 36 comprises a process, the liveness check function can be substantially similar to methods used for process liveness checking in GCSs known in the art. Whatever the nature of the function that is used, object 40 invokes the function at a function invocation step 126, and examines the returned code to determine whether or not the member is alive.

As indicated at step 128, the liveness checking method may also comprise sending a message to FGM 36 and awaiting the response. In this case, FGMRep object 40 sends the message, at a send step 130, and sets a timer to a specified value, at a timing step 132. If the FGM responds before the timer expires, at a response step 134, typically using a specified livenessResponse method, then the timer is reset, at a reset step 136. This member is then noted as being alive, at a step 138. On the other hand, if the timer rings before the livenessResponse method is invoked, a liveness failure is returned, at a step 140.

Step 142 indicates another method for liveness checking, which is commonly used in the GCS art and can be implemented using GCS 34 and FGM 36. In this case, at an ID check step 144, FGMRep object 40 checks for the existence of a process in FGM 36 having a specified process identifier (process ID). The ID is assigned by the operating system software running on system 20. If the process with the specified ID is found to exist, then the FGM is considered to be alive.

Step 146 indicates still another method for liveness checking, based on checking a queue in FGM 36. If the queue is found not to be full, at a queue check step 148, then it is assumed that the FGM is responding to service requests and is therefore alive. If the queue is full, a liveness failure is indicated.

The features of the GCS and flexible member model described herein may be used together or in various sub-combinations to provide a range of advantages in supporting distributed applications. These advantages include, inter alia:

Low latency—A common problem of GCSs is the extra overhead in ordering each message, affecting message latency. Callbacks, by saving memory copy and context switches, reduce message latency.

Increased throughput—When message traffic is high, there are many context switches, which degrade machine performance. In such cases, callback implementation, which avoids context switches, is preferred over other implementations that cause such switches.

Implementation flexibility—Many distributed applications are multi-threaded. For example, the Sun Microsystems Network File System (NFS) server is typically structured as a set of peer threads, each handling requests in its turn; the NFS client consists of a set of peer threads handling write caching on the client side. When such an application needs to be superimposed on a GCS, the FGM model allows all of the client threads (including those used to invoke operations on the NFS sub-tree) to become a single FGM. Similarly, it allows all of the NFS server threads to become another FGM member. When a new application is to be developed utilizing a GCS, the FGM model removes many constraints in structuring the application on each node. As a special case, consider an object-oriented application, which structures each component as a set of objects. These objects may or may not be bounded to a single process or thread. Such an application can be integrated into the FGM-based GCS environment in a straightforward manner.

Reduced time to handle a message—Callbacks are beneficial particularly when only a short handler is required for a given message type. When it is anticipated that a message will require a long time to handle, a short callback handler can be used to invoke a suitable process.

Applicability to single process systems—In such systems, group members cannot be processes. Instead, the present invention allows them to be implemented as FGMCallbackFunctions, which are executed by a single GCS process. Examples of such systems include embedded systems and thin clients running a single Java Virtual Machine.

Reduction in cost of creating processes—Systems in which creating processes is excessively expensive and/or inefficient, such as the IBM AS/400, can use FGM-CallbackFunctions instead.

Although preferred embodiments described herein are based on a GCS, it will be appreciated that the principles of the present invention may similarly be is implemented in substantially any distributed computing environment in which there are mechanisms for ordered message handling and keeping track of "liveness" of entities in a computing group or cluster. It will thus be appreciated that the preferred embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

APPENDIX

```
class FGMRep
{
    public:
        /**************************************/
        /* Methods invoked by FGM only.       */
        /**************************************/
        // The general constructor:
        // GroupName is the name of the Group that the DA
        // wants to join.
        // FGMLivenessFunction and FGMCallbackFunctions are
        // the essential components of the FGM.
        FGMRep (GroupName &, FGMLivenessFunction lf,
            FGMCallbackFunctions cf);
        // Following are convenience functions, which invoke
        // the general constructor
        // Process existence check is assumed as the
        // liveness check.
```

APPENDIX-continued

```
        // No callbacks. Queue is used for upstream message
        // delivery for all messages.
        FGMRep (GroupName &, FGMProcessId &, FGMQueue &);
        // Queue not full check is assumed as the liveness
        // check.
        // No callbacks. Queue is used for inbound message
        // delivery for all messages.
        FGMRep (GroupName &, FGMQueue &);
        // Periodic liveness check message is sent to the
        // queue, livenessResponse ( ) is expected to be
        // called within the specified period of time.
        // Queue is used for inbound message delivery for
        //all messages.
        FGMRep (GroupName &, GCSTime &liveness_period,
            FGMQueue &);
        // Liveness check function is periodically
        // invoked. Its return value indicates liveness
        // status. Queue is used for inbound message
        // delivery for all messages.
        FGMRep (GroupName &, FGMLivenessFunction *function,
            FGMQueue &);
        // Process existence check is assumed as the
        // liveness check. Each of the passed callback
        // functions is invoked each for its upstream
        // message type.
        // These callbacks must cover all types of upstream
        // messages. If a single function is specified, it
        // is invoked for all types of messages. No queue.
        FGMRep (GroupName &, FGMProcessId &,
            FGMCallbackFunctions &);
        // Liveness check function is periodically
        // invoked. Each of the passed callback functions
        // is invoked for its upstream message type.
        // These callbacks must cover all types of
        // upstream messages. If a single function is
        // specified, it is invoked for all types of
        // messages. No queue.
        FGMRep (GroupName &, FGMLivenessFunction &,
            FGMCallbackFunctions &);
        // Process existence check is assumed as the
        // liveness check. The passed callback functions
        // are invoked for the upstream message types that
        // are defined. For other message types, the
        // message is enqueued to the specified queue.
        // There is no meaning to specifying a single
        // function for all kinds of messages,
        // otherwise the specified queue is useless.
        FGMRep (GroupName &, FGMProcessId &,
            FGMCallbackFunctions &, FGMQueue &);
        // Liveness check function is periodically
        // invoked. The passed callback functions are
        // invoked for the upstream message types for
        // which they are defined.
        // For other message types, the message is
        // enqueued to the specified queue. There is no
        // meaning to specifying a single function for all
        // kinds of messages, otherwise the specified
        // queue is useless.
        FGMRep (GroupName &, FGMLivenessFunction &,
            FGMCallbackFunctions &, FGMQueue &);
        // Queue not full check is assumed as the liveness
        // check. The passed callback functions are
        // invoked for the upstream message types for
        // which they are defined.
        // For other message types, the message is
        // enqueued to the specified queue. There is no
        // meaning to specifying a single function for all
        // kinds of messages, otherwise the specified
        // queue is useless.
        FGMRep (GroupName &, FGMCallbackFunctions &,
            FGMQueue &);
        // Periodic liveness check message is sent to the
        // queue, livenessResponse ( ) is expected to be
        // called within the specified period of time.
        // The passed callback functions are invoked for
        // the upstream message types for which they are
        // defined.
        // For other message types the message is enqueued
        // to the specified queue. There is no meaning to
```

APPENDIX-continued

```
        // specifying a single function for all kinds of
        // messages, otherwise the specified queue is
        // useless.
        FGMRep (GroupName &, GCSTime &liveness_period,
            FGMCallbackFunctions &, FGMQueue &);
        ~FGMRep ( );
        void       livenessResponse ( );
        /****************************************/
        /* Methods invoked by FGM and GCS.     */
        /****************************************/
        GCSToken   getToken ( );
        /****************************************/
        /* Methods invoked by GCS only.        */
        /****************************************/
        void       setToken (GCSToken &);
        FGMDeliverReturnCode deliverMshp ( );
        FGMDeliverReturnCode deliverPeer ( );
        FGMDeliverReturnCode deliverError ( );
        FGMDeliverReturnCode deliverEvent ( );
        FGMDeliverReturnCode deliverOther ( );
        FGMLivenessStatus livenessCheck ( );
private:
        GCSToken __token;
        GroupName __group__name;
        // NULL if no liveness function is provided.
        FGMLivenessFunction * __liveness_ptr;
        // 0 if periodic liveness message is not used.
        GCSTime __liveness_period;
        // 0 if pid existence liveness check isn't used.
        FGMProcessId __pid;
        // NULL if no queue is specified.
        FGMQueue * __queue_ptr;
        // NULL if no callbacks were specified.
        FGMCallbackFunctions * __callbacks;
}
class FGMCallbackFunctions
{
    public:
        // Number of callback function entries
        // specified.
        int __number_of_elements;
        // These are the permissions that need to be
        // acquired when invoking the callback functions.
        // It is also possible to specify a separate
        // permission per each callback function, or even
        // per each message type.
        FGMPermissions __permissions;
        // Array of callback functions and types of
        // messages upon which they should be invoked. If
        // an ALL_TYPES is specified for a callback, then
        // there is no meaning in specifying other
        // callbacks - they will never be invoked. So the
        // array should contain only this entry.
           FGMCallbackEntry * __callback_entries_ptr;
}
class FGMCallbackEntry
{
    public:
        // Indicates which type of mesage should cause
        // invocation this handler.
        GCSMsgType __type;
        // Callback function pointer. FGMCallback is an
        // object containing a callback function pointer
        // and parameters.
        FGMCallback * __callback_ptr;
}
// MessageType does not have to be enum. Rather, it could
// be a dynamically extendable type list.
enum MessageType
{
    ALL_TYPES,
    MSHP_TYPE,
    PEER_TYPE,
    ERROR_TYPE,
    EVENT_TYPE,
    RESERVED_TYPE
}
```

What is claimed is:

1. A method for distributing messages among a group of member computing nodes, which are mutually-linked in a distributed computing system and take part in a distributed software application, the method comprising conveying a sequence of messages to all of the member nodes in the group in accordance with a communication protocol such that the messages are delivered in a uniform order to all of the member nodes, while on at least one of the member nodes there is no process involved in running the distributed software application for at least some time while the distributed software application is running on the group of member nodes.

2. A method according to claim 1, wherein the at least one of the member nodes that has no process holds a data structure used in the distributed software application.

3. A method according to claim 1, wherein the at least one of the member nodes that has no process comprises a device used in the distributed software application.

4. A method according to claim 1, wherein on another one of the member nodes there is a plurality of processes involved in running the distributed software application.

5. A method according to claim 1, wherein conveying the sequence of messages in accordance with the communication protocol comprises delivering the messages using a group communication system.

6. A method according to claim 1, and comprising periodically checking to determine whether any of the member nodes is unable to perform a part in the application, including the at least one of the member nodes that has no process.

7. A method according to claim 6, wherein periodically checking comprises defining a respective liveness function for each of the member nodes to determine whether the member nodes are functioning and able to participate in the application, such that different, respective liveness functions are defined for two or more of the member nodes.

8. A method according to claim 1, wherein conveying the sequence of messages comprises invoking callback functions for use by the member nodes in processing the messages.

9. A method according to claim 8, wherein conveying the sequence of messages comprises, at least for messages in the sequence of one or more specified types, waiting for the callback function invoked by a first message in the sequence to return before delivering a second, subsequent message, whereby the uniform order is maintained.

10. A method according to claim 1, and comprising:
    assigning a unique, respective token to each of the member nodes;
    receiving a message, in accordance with the protocol, sent by one of the member nodes, the message including the respective token; and
    processing the message responsive to the token.

11. A method for distributing messages among a group of member computing nodes, which are mutually-linked in a distributed computing system and take part in a distributed software application, the method comprising conveying a sequence of messages to all of the member nodes in the group in accordance with a communication protocol such that the messages are delivered in a uniform order to all of the member nodes, while on at least one of the member nodes there is a plurality of processes involved in running the distributed software application.

12. A method according to claim 11, wherein conveying the sequence of messages in accordance with the communication protocol comprises delivering the messages using a group communication system.

13. A method according to claim 11, and comprising defining a respective liveness function for each of the member nodes to determine whether the member nodes are functioning and able to participate in the application, and periodically using the liveness function to determine whether any of the member nodes is unable to perform a part in the application, wherein the liveness function invokes a response by one of the plurality of processes on the at least one of the member nodes.

14. A method according to claim 11, wherein conveying the sequence of messages comprises invoking callback functions for use by the member nodes in processing the messages.

15. A method according to claim 14, wherein conveying the sequence of messages comprises, at least for messages in the sequence of one or more specified types, waiting for the callback function invoked by a first message in the sequence to return before delivering a second, subsequent message, whereby the uniform order is maintained.

16. A method according to claim 11, and comprising:
assigning a unique, respective token to each of the member nodes;
receiving one or more messages, in accordance with the protocol, sent by one of the member nodes, the messages including the respective token; and
processing the messages responsive to the token.

17. A method according to claim 16, wherein receiving the one or more messages comprises receiving respective first and second messages from first and second processes among the plurality of processes running on the at least one of the member nodes, both the first and second messages including the same token.

18. A method for transferring messages among a group of member computing nodes, which are mutually-linked in a distributed computing system and which communicate in accordance with a communication protocol such that a sequence of messages is delivered to all of the member nodes in the group in an order that is uniform among all of the member nodes, the method comprising:
assigning a unique, respective token to each of the member nodes;
receiving a message, in accordance with the protocol, sent by one of the member nodes, the message including the respective token assigned to the one of the member nodes sending the message; and
processing the message responsive to the token.

19. A method according to claim 18, wherein processing the message comprises identifying the one of the member nodes sending the message based on the token.

20. A method according to claim 18, wherein the one of the member nodes sending the message has a plurality of objects involved in running a distributed software application, and wherein receiving the message sent by the member entity comprises receiving respective messages from two or more of the plurality of objects, wherein the respective messages include the same token.

21. A method according to claim 18, wherein the member nodes take part in a distributed application running on the system.

22. A method according to claim 18, wherein receiving the message in accordance with the protocol comprises receiving the message using a group communication system.

23. A method according to claim 18, wherein receiving the message comprises invoking a callback function associated with the member node and receiving the message responsive to the callback function.

24. In a distributed computing system, in which a group of mutually-linked member computing nodes communicate in accordance with a communication protocol such that a sequence of messages is delivered to all of the member nodes in the group in an order that is uniform among all of the member nodes, a method for processing the messages received by the member computing nodes, comprising:
defining for each node among the member nodes at least one callback function to be invoked when messages of a predetermined type are handed to the node, such that different callback functions are defined for different nodes in the group of member nodes;
receiving a message of the predetermined type; and
invoking the callback function to process the message.

25. A method according to claim 24, wherein defining the at least one callback function comprises defining a plurality of different callback functions for a corresponding plurality of different message types.

26. A method according to claim 24, wherein receiving the message of the predetermined type comprises receiving the message from a group communication system.

27. A method according to claim 24, wherein the member nodes take part in a distributed application running on the system.

28. A method according to claim 27, wherein defining the at least one callback function comprises defining a liveness check function for each of the member nodes to determine whether the member nodes are functioning and able to participate in the application, and wherein receiving the message of the predetermined type comprises periodically receiving a liveness check message sent by one of the member nodes to ascertain whether the other member nodes are functioning and able to participate in the application, and wherein invoking the callback function comprises invoking the liveness check function responsive to the liveness check message.

29. A method according to claim 24, wherein invoking the callback function comprises aborting delivery of the message if the callback function does not return within a specified time.

30. A method according to claim 24, wherein invoking the callback function comprises waiting for the callback function invoked by a first message in the sequence to return before invoking a callback function to handle a second, subsequent message, whereby the uniform order is maintained.

31. A method according to claim 24, wherein invoking the callback function comprises acquiring a permission required for the callback.

32. A method according to claim 24, wherein defining the at least one callback function comprises defining a callback such that when messages of the predetermined type are received, they are passed to a designated process run by the node.

33. In a distributed computing system, in which a group of mutually-linked member computing nodes take part in a distributed computing application, a method for checking whether the member computing nodes are functioning and able to participate in the distributed computing application, the method comprising:
defining a respective liveness function for each member node that joins the group, to determine whether the member nodes are functioning and able to participate in the application, such that at least two of the member nodes have different liveness functions; and
periodically invoking the liveness functions of the member nodes so as to determine whether any of the nodes is unable to participate in the application.

34. A method according to claim 33, wherein invoking the liveness function comprises conveying a liveness check request from a group communication system.

35. A method according to claim 33, wherein defining the liveness function comprises defining a liveness function for at least one of the member nodes substantially without reference to execution of any process by the at least one of the member nodes.

36. A method according to claim 33, wherein defining the liveness function comprises, for at least one of the member nodes, defining a message that is sent to an object on the member node when the function is invoked.

37. A method according to claim 36, wherein periodically invoking the liveness functions comprises sending the message and determining whether the object responds within a predetermined period of time.

38. A method according to claim 33, wherein defining the liveness function comprises, for at least one of the member nodes, defining a function that checks the existence of a process with a specified identification.

39. A method according to claim 33, wherein defining the liveness function comprises, for at least one of the member nodes, defining a function that checks whether a queue held by the member node is full.

40. In a distributed computing system, in which a group of mutually-linked member computing nodes take part in a distributed computing application, a method for checking whether a given node among the member computing nodes is functioning and able to participate in the distributed computing application, the method comprising periodically invoking a liveness function to be carried out by the given node so as to determine whether the given node is unable to participate in the application, without reference to execution of any process by the given node.

41. A method according to claim 40, wherein invoking the liveness function comprises conveying a liveness check request from a group communication system.

42. A method according to claim 40, wherein invoking the liveness function comprises, for at least one of the member nodes, sending a message to an object on the member node and determining whether the object responds within a predetermined period of time.

43. A method according to claim 40, wherein invoking the liveness function comprises, for at least one of the member nodes, checking whether a queue held by the member node is full.

44. Distributed computing apparatus, comprising:

a computer network; and a group of computer nodes, arranged to take part in a distributed software application and mutually-linked by the network in accordance with a communication protocol such that when a sequence of messages is transmitted in the group, the messages are delivered to all of the nodes in a uniform order, while on at least one of the nodes there is no process involved in running the distributed software application for at least some time while the distributed software application is running on the group of nodes.

45. Apparatus according to claim 44, wherein the at least one of the member nodes that has no process holds a data structure used in the distributed software application.

46. Apparatus according to claim 44, wherein the at least one of the member nodes that has no process comprises a device used in the distributed software application.

47. Apparatus according to claim 44, wherein the communication protocol comprises a group communication system.

48. Distributed computing apparatus, comprising:

a computer network; and a group of computer nodes, arranged to take part in a distributed software application and mutually-linked by the network in accordance with a communication protocol such that when a sequence of messages is transmitted in the group, the messages are delivered to all of the nodes in a uniform order, while on at least one of the nodes there is a plurality of processes involved in running the distributed software application.

49. Distributed computing apparatus, comprising:

a computer network; and a group of computer nodes, mutually-linked by the network using a group communication system such that when a sequence of messages is transmitted in the group, the messages are delivered to all of the nodes in a uniform order, wherein a unique token is respectively assigned to each of the nodes, such that whenever a message is passed from any one of the nodes to the group communication system, the message includes the respective unique token.

50. Apparatus according to claim 49, wherein at least one of the member nodes has a plurality of objects involved in running a distributed software application, and wherein two or more of the plurality of objects are adapted to convey messages that include the same token to the group communication system.

51. Distributed computing apparatus, comprising:

a computer network; and a group of computer nodes, mutually-linked by the network in accordance with a communication protocol such that when a sequence of messages is transmitted in the group, the messages are delivered to all of the nodes in a uniform order, and such that for each of the nodes, at least one callback function is defined, to be invoked when messages of a predetermined type are handed to the nodes, such that different callback functions are defined for different nodes in the group.

52. Apparatus according to claim 51, wherein a plurality of different callback functions are defined for a corresponding plurality of different message types.

53. Distributed computing apparatus, comprising:

a computer network; and a group of computer nodes, mutually-linked by the network and configured to take part in a distributed computing application running on the apparatus, wherein a respective liveness function is defined for each node that joins the group to determine whether the nodes are functioning and able to participate in the application, such that at least two of the member nodes having different liveness functions, which liveness functions are invocable so as to determine whether any of the nodes is unable to participate in the application.

54. Apparatus according to claim 53, wherein the liveness function is invoked by a group communication system.

55. Distributed computing apparatus, comprising:

a computer network; and a group of computer nodes, mutually-linked by the network and configured to take part in a distributed computing application running on the apparatus, wherein a respective liveness function is defined for at least one of the nodes for checking whether the at least one of the nodes is functioning and able to participate in the distributed computing application, and wherein the liveness function is invoked so as to determine whether the at least one of the nodes is unable to participate in the application, without reference to execution of any process by the at least one of the nodes.

56. A computer software product for distributing messages among a group of member computing nodes, which are mutually-linked in a distributed computing system and are arranged to take part in a distributed software application, the product comprising a computer-readable medium having program instructions stored therein, which instructions, when read by one of the member nodes, cause the one of the member nodes to convey a sequence of messages to all of the member nodes in the group in accordance with a communication protocol such that the messages are delivered in a uniform order to all of the member nodes, while on at least one of the member nodes there is no process involved in running the distributed software application for at least some time while the distributed software application is running on the group of member nodes.

57. A product according to claim 56, wherein the product comprises group communication system middleware.

58. A computer software product for distributing messages among a group of member computing nodes, which are mutually-linked in a distributed god computing system and are arranged to take part in a distributed software application, the product comprising a computer-readable medium having program instructions stored therein, which instructions, when read by one of the member nodes, cause the one of the member nodes to convey a sequence of messages to all of the member nodes in the group in accordance with a communication protocol such that the messages are delivered in a uniform order to all of the member nodes, while on at least one of the member nodes there is a plurality of processes involved in running the distributed software application.

59. A computer software product for transferring messages among a group of member computing nodes, which are mutually-linked in a distributed computing system and which communicate in accordance with a communication protocol such that a sequence of messages is delivered to all of the member nodes in the group in an order that is uniform among all of the member nodes, the product comprising a computer-readable medium having program instructions stored therein, which instructions, when read by the member nodes, cause the member nodes to assign respective unique tokens to the member nodes, such that messages including the respective tokens are sent by the member nodes in accordance with the protocol and are processed responsive to the tokens.

60. A computer software product for use in a distributed computing system in which a group of mutually-linked member computing nodes communicate in accordance with a communication protocol such that a sequence of messages is delivered to all of the member nodes in the group in an order that is uniform among all of the member nodes, the product comprising a computer-readable medium having program instructions stored therein, which instructions, when read by the member nodes, cause the member nodes to define for each of the member nodes at least one callback function, to be invoked when messages of a predetermined type are handed to the nodes, such that when a message of the predetermined type is received by one of the member nodes, the callback function is invoked to process the message, and such that different callback functions are defined for different nodes in the group.

61. A computer software product for use in a distributed computing system in which a group of mutually-linked member computing nodes take part in a distributed computing application, the product comprising a computer-readable medium having program instructions stored therein, which instructions, when read by the member nodes, cause the nodes to define a respective liveness function for each node that joins the group to determine whether the nodes are functioning and able to participate in the application, such that at least two of the member nodes have different liveness functions, and which further cause the member nodes to periodically invoke the liveness functions so as to determine whether any of the member nodes is unable to participate in the application.

62. A computer software product for use in a distributed computing system in which a group of mutually-linked member computing nodes take part in a distributed computing application, the product comprising a computer-readable medium having program instructions stored therein, which instructions, when read by the member nodes, cause the nodes to periodically invoke a liveness function to be carried out by a given one of the member nodes so as to determine whether the given one of the member nodes is functioning and able to participate in the distributed computing application, wherein the liveness function is carried out by the given one of the member nodes without reference to execution of any process by the given one of the member nodes.

\* \* \* \* \*